PERFORATED TAPE ACCESSORY APPARATUS FOR A CIPHERING MACHINE

Filed Feb. 17, 1964 2 Sheets-Sheet 1

INVENTOR
BORIS CAESAR WILHELM HAGELIN

BY [signature]

ATTORNEYS.

PERFORATED TAPE ACCESSORY APPARATUS FOR A CIPHERING MACHINE

Filed Feb. 17, 1964 2 Sheets-Sheet 2

INVENTOR
BORIS CAESAR WILHELM HAGELIN

BY Werner W. Kleeman

ATTORNEYS.

United States Patent Office 3,485,948
Patented Dec. 23, 1969

3,485,948
PERFORATED TAPE ACCESSORY APPARATUS FOR A CIPHERING MACHINE
Boris Caesar Wilhelm Hagelin, Zug, Switzerland, assignor to Anstalt Europaische Handelsgesellschaft, Vaduz, Liechtenstein, a corporation of Liechtenstein
Filed Feb. 17, 1964, Ser. No. 345,497
Claims priority, application Switzerland, Feb. 22, 1963, 2,279/63
Int. Cl. H04l *9/00, 15/24*
U.S. Cl. 178—22 7 Claims

ABSTRACT OF THE DISCLOSURE

An independent perforated tape accessory unit utilized with a ciphering machine operating according to a binary multiple step code, the accessory unit comprising a tape perforator, a perforated tape reader, a plurality of code translator means, and first and second switch means which selectively connect the tape perforator and the tape reader to the coding machine with one code translator being arranged between the tape perforator and the ciphering machine and with a second code translator being arranged between the tape reader and the ciphering machine. The selective interconnection of the various units comprising the perforated tape accessory device greatly increases the operational possibilities of the basic ciphering machine.

The present invention has reference to a new and improved perforated tape translator for a ciphering machine. The perforated tape translator of the present invention has as one of its prime functions to process information delivered by the ciphering machine to put such in a form suitable for telegraphic transmission, for example by teleprinter. As a result, the previously necessary transcribing work can be dispensed with, to thereby obtain greater operating speeds.

A primary aspect or object of the perforated tape translator according to the invention resides in the selective interconnection of a tape perforator, a perforated tape reader and code translating means, with the information delivered from the cipher machine being transformed into perforated code and the information appearing in perforated tape code beng deciphered for example.

According to a further feature of the invention the tape translator can advantageously be provided with a programming device which delivers additional signals to the incoming information. The perforated tape reader is also advantageously provided with a program detector which holds back predetermined signals. Advantageously, the perforated tape translator is provided with a selector switch by means of which the tape perforator can be operably connected with the input or the output side of a ciphering mechanism of the ciphering machine. A further selector switch can be provided which renders it possible for the perforated tape reader to act directly upon the tape perforator or through the interconnection of the ciphering mechanism. The information appearing at the perforated tape can be reproduced in the form of characters or printing type by means of the printing unit of the ciphering machine.

Due to the possibility of being able to selectively interconnect in operable relation different components of the system it is rendered possible to perform various operational possibilities, some of the more noteworthy ones of which will be indicated as the description proceeds.

Figure 1:
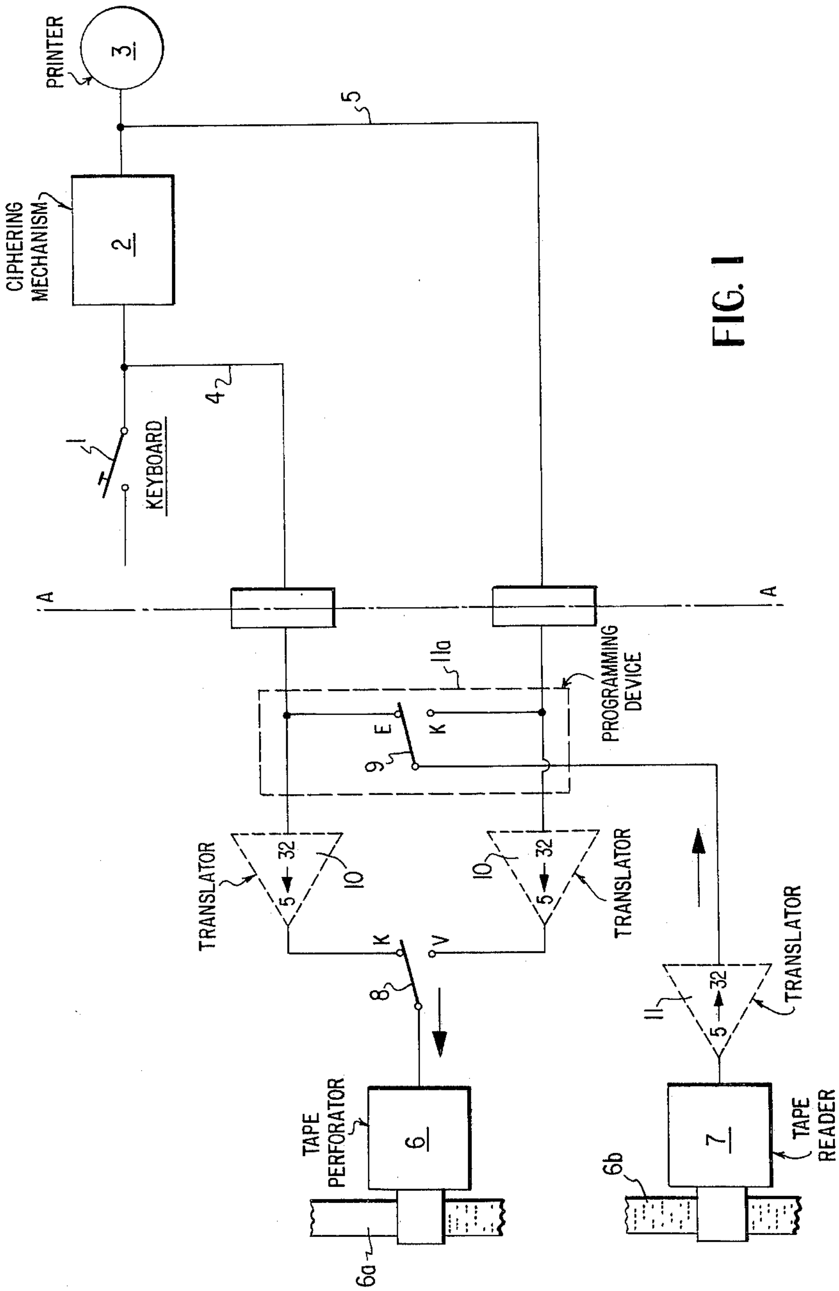
Figure 2:
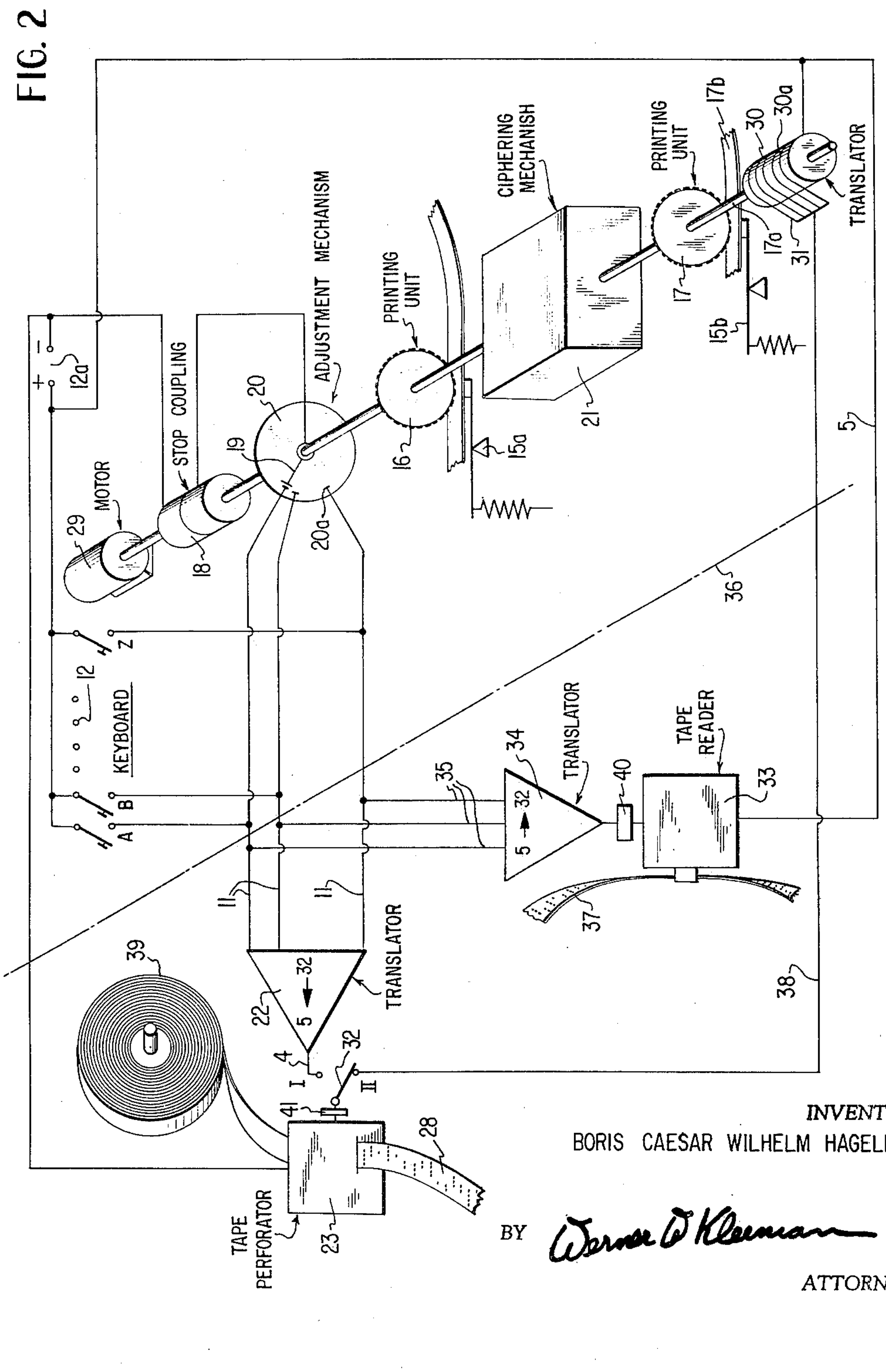

Other features, objects and advantages of the invention will become apparent by reference to the following detailed description and drawings in which:

FIGURE 1 schematically illustrates a basic circuit diagram of the perforated tape translator of the invention provided with conductor connections or branch lines to the ciphering machine; and FIGURE 2 is a schematic illustration of essential components of a practical embodiment of a ciphering machine as well as the connection thereto of the perforated tape translator, and functioning generally along the principles of the system of FIGURE 1.

Proceeding now with the description of the invention, the teleprinter alphabet in conjunction with which the invention will be described by way of illustration, is assumed to possess a total of 32 five-code symbols. Such a teleprinter alphabet system is well known to those skilled in the art of telegraphic transmission, so that further explanation thereof would appear unwarranted. For the processing of these symbols a like number of transmission conductors or lines are necessary. However, the number of conductors can be reduced when working with the known five-unit code for telegraphy. It is to be clearly understood, however, that the teachings of the invention are not limited in application to this illustrative information system, rather they can be equally well employed with any desired type of cipher system.

Directing attention now to the circuit diagram schematically illustrated in FIGURE 1, it is to be understood that the perforated tape translator appears to the left of the center-line A—A and the ciphering machine to the right thereof. The ciphering machine comprises a suitable ciphering mechanism 2 equipped with a keyboard 1 and printing unit 3. The primary text conductors or leads 4 extend from the input side of the ciphering mechanism 2 and normally contain the deciphered information. At the output side of this ciphering mechanism 2 there are located the secondary text conductors or leads 5 normally containing the ciphered information.

The perforated tape translator, on the other hand, is comprised of a tape puncher or perforator means 6 of conventional construction, a suitable perforated tape reader 7, reversing or selector switches 8, 9, a translating device 10 for changing the employed 32-alphabet system into five-unit code, a translating device 11 for changing five-unit code into the 32-alphabet system, and finally, a programming device schematically depicted by the dashed block represented by reference numeral **11*a***.

With the general arrangement above-described and assuming for the moment that it is desired to perforate a clear or plain text, for example an address, in such instance the selector switch 8 is moved into position K. Under such setting of the apparatus, the clear text introduced at the coding machine keyboard 1 is delivered via the primary text leads 4 to the translating device 10 and is perforated in five-unit code as a clear text by means of the tape perforator means 6. On the other hand, if it is desired to perforate cipher text then the ciphering mechanism 2 is placed in operation, the selector switch 8 shifted to position V, whereby the clear text introduced at keyboard 1 is enciphered by ciphering mechanism 2 and delivered via secondary text leads 5 and associated translating device 10 to the tape perforator 6 which applies the ciphered text in perforated tape five-unit code form to the tape **6*a*. With the system shown in FIGURE 1, and during such time as ciphered information is punched at the tape perforator 6 it is also possible to simultaneously print the ciphered text at the printing device 3. The perforated tape 6*a* thus obtained can be delivered to a tape transmitter, for example a teleprinter station and can be transmitted via the standard teleprinter network. Quite obviously, ciphered information could, if desired, be initially introduced at the keyboard 1**.

When deciphering information where the text already appears as a perforated tape **6*b* for example and produced by means of a receiving perforator, as such is well known to the art, such tape 6b is inserted in the perforated tape reader 7 of the aforedescribed apparatus. In the event that a clear text is initially present such is printed at the printing unit 3, with the selector switch 9 of the programming device 11a being in position K, whereby the clear text information is delivered directly to the printing unit 3 without employing the ciphering mechanism 2. On the other hand, if the selector switch 9 is displaced into position E the original clear text is delivered via the primary leads 4 through the ciphering mechanism 2 and appears as printed cipher text at the printing unit 3. Furthermore, with the last-mentioned situation, if the selector switch 8 is also in position V it is further possible to deliver this ciphered text appearing at secondary leads 5 to the perforator 6 to produce a coded text perforated tape 6a starting from a clear text perforated tape 6b**.

As a further possibility, and assuming that the perforated tape 6b has applied thereto a ciphered text, then with selector switch 9 in position K such ciphered text can be directly printed at the printing unit 3. Again assuming a perforated ciphered text appears at the tape 6b and with selector switch 9 now in position E and selector switch 8 in position V then such original ciphered text can be delivered to the ciphering mechanism 2, there deciphered and printed as deciphered or clear text at printing unit 3, with the further possibility existing of delivering the deciphered text via secondary leads 5 to perforator means 6 to produce a deciphered text at the perforated tape 6a. In this latter instance, it will be appreciated, a deciphered perforated tape 6a can be produced when starting with a ciphered perforated tape 6b.

The foregoing discussion of the arrangement of ciphering machine and perforated tape translator apparatus should make it manifest that numerous operating possibilities are available, particularly due to the fact that the tape perforator means 6, tape reader means 7, and translating means 10, 11 can be selectively intercoupled with the ciphering machine proper, and more specifically with the input and output side of the ciphering mechanism 2 thereof.

In FIGURE 2 there is illustrated an embodiment of ciphering machine provided with perforated tape translator constructed and arranged according to the teachings of the invention, and substantially operating according to the principles previously explained in conjunction with the description of FIGURE 1. By inspecting FIGURE 2 it will be seen that the ciphering machine proper comprises a keyboard 12, corresponding to keyboard 1 of FIGURE 1, and provided, for example, with 32 keys and a like number of individual key contacts A, B, . . . Z, etc. This ciphering machine further incorporates duplex printing unit 15a, 15b which prints the text by means of suitable rotating type wheels 16, 17 or equivalent physical structure, whereby the so-called primary type wheel 16 actuated by the keyboard 12 possesses an electrical adjustment mechanism or means. This electric adjustment mechanism comprises stop coupling means 18, revolving scanning arm or selecting lever 19 cooperating with collector 20 having a number of contact segments 20a corresponding in number to the number of characters. It will further be seen that a suitable drive motor 29 is provided for driving the scanning arm 19 and type wheel 16, via stop coupling 18. The secondary type wheel 17 which normally prints ciphered text is actuated by the ciphering mechanism 21 of the ciphering machine, in a manner not illustrated, but will readily suggest itself to those versed in the art.

What has been conveniently designated herein as a control combination 30, provided with five cam disks 30a having suitably designed cams thereon which actuate five contacts 31, is seated upon rotatable shaft 17a of the secondary type wheel 17. As an equivalent construction serving the same purpose to achieve the same result, the control combination 30 can also embody a fivefold divided contact or segment ring which is scanned by five brushes. The illustrated contacts 31 lead via five conductors 38 (for convenience in illustration only one of which is shown) to a conventional perforator 23 (corresponding to perforator 6 of FIGURE 1) of the type provided with five perforating magnets (not shown) for producing a five-unit ciphered perforated tape 28. It should be appreciated that the control combination 30 together with the contacts or contact arms 31 and five conductors 38 provides a translating device, equivalent to the lowermost translating device 10 of FIGURE 1, and for the purpose of changing a ciphered 32-alphabet system into five-unit code. Of course, a 32-conductor output is conceivable which would then deliver the ciphered 32-alphabet system, transformed into five-unit code at a non-illustrated translating device, to the five conductors 38.

Considerating now the operation of the system of FIGURE 2, during printing and by means of actuating one of the contacts or keys A, B . . . etc. of the keyboard 12 the contact or segments 20a associated with such a depressed key is supplied with positive potential from power source 12a. The revolving selecting lever 19, upon arriving at such segment 20a, completes a circuit to the stop coupling 18, whereby the type wheel 16 as well as the ciphering mechanism 21 are disconnected from the drive motor 29, and further, through the agency of non-illustrated means the printing unit 15a is caused to print the letters of the clear text, for the present assumed to have been infed at the keyboard 12.

The ciphering mechanism 21 places the type wheel 17 into operation and through the agency of suitable non-illustrated means triggers the printing unit 15b which then prints the ciphered text letters upon the paper strip 17b or otherwise. Simultaneously, the information letters or characters being processed are converted to five-unit code at the control combination 30. Such information is received by the contact arms 31 and delivered to the five perforating magnets of the perforator 23 via the fivefold conductor system 38 and the selector switch 32 (corresponding to switch 8 of FIGURE 1), which during this time is in position II. The perforator 23 then correspondingly perforates a length of the tape roll 39 and delivers such in the form of perforated tape 28.

On the other hand, if it is desired to perforate a clear text then the selector switch must be displaced into position I. In this case, the perforator 23 is then controlled from the keyboard 12 via the conductors 11 and the translating device 22 (corresponding to the uppermost translating device 10 of FIGURE 1) which transforms the 32 information characters or symbols into five-unit code. The clear text appearing at the printing unit 15a is then simultaneously punched upon the tape 28 at the perforator 23. As a general rule, during such operation the ciphered text appearing at printing unit 15b will not make any sense since for the address in clear cipher the ciphering mechanism 21 is not placed in operation and only runs along idle. Naturally, it is also possible to completely switch-out the ciphering mechanism 21.

Now, for deciphering a ciphered perforated tape 37 for example, such is inserted in the tape reader 33 (corresponding to tape reader 7 of FIGURE 1), which in known manner conducts the cipher information to one of the 32 conductors 35 provided for the symbols or characters via the translating device 34 (corresponding to translating device 11 of FIGURE 1). The conductors 35 then again control the primary printing unit 15a and the ciphering mechanism 21 by completing a circuit to the stop coupling 18 via the leads or conductors 11, much in the manner aforedescribed. At the printing unit 15a the ciphered text of the perforated tape 37 is then printed and, insofar as the ciphering mechanism 21 is set to "decipher," the clear text will appear at the printing unit 15b. This clear text can, however, by virtue of the circuit selected by selector switch means 32 also be delivered to the perforator 23 via the control combination 30 and the conductors 38, in such instance the selector switch 32 being in position II, whereby a clear text can be perforated at the tape 28 while starting with a ciphered perforated tape 37. This provides the additional possibility of producing from such clear text perforated tape 28 any desired quantity of copies of the clear text in any suitable mechanical manner.

On the other hand, if the perforated tape 37 contains clear text, then such clear text will be printed at printing unit 15*a*, the ciphered text can be printed at printing unit 15*b*, and a ciphered text perforated tape 28 can, in this case, be produced via perforator 23 when starting with a clear text perforated tape 37. It should thus be appreciated that the ciphering machine provided according to the invention with perforated tape translator constructed and arranged as explained, provides for numerous working possibilities, for example as previously mentioned, due to the possibility of selectively intercoupling various components of the system.

The dash-dot line 36 of FIGURE 2 (substantially corresponding to line A—A of FIGURE 1) schematically denotes the location of separation between the actual ciphering machine to the right thereof and the perforated tape translator to the left thereof.

A further aspect of the invention resides in equipping both the tape reader 33 and perforator 23 with known programming elements 40 and 41, respectively. In the case of the perforator 23 such programming element 41 constitutes a program element adder serving to intersperse the perforated ciphered text during ciphering, or in fact, if desired, a perforated clear text, with technical signals in such a manner that reproduction at a teleprinter delivers five-unit groups prescribed by international telegraph regulations, whereby for page printing also the "carriage return" and "line feed" commands can be simultaneously incorporated.

On the other hand, for the deciphering of a perforated tape for example, such as tape 37, and which has been "programmed" in such a manner, the tape reader 33 is equipped with the programming element 40 which, in this instance, constitutes a program element detector or eliminator serving to eliminate all technical signals and only delivers to the conductor 35 the actual characters, since otherwise a character-like synchronism of the ciphering mechanism 21 cannot be guaranteed. Programming elements 40 and 41 may typically be of the type disclosed in United States Patent No. 3,229,037 at column 5, line 9 et seq. and at column 6, line 8 et seq. respectively.

A clear tape (deciphered text) to be perforated is then preferably likewise interspersed with the known page printer signals via the programming element adder 41, since thereby documentary processing of the deciphered text which can be copied at a page printer is considerably improved in comparison with the tape of printing unit 15*b*. It is, of course, also possible to copy a perforated tape 37 whereby according to the switching of the programming elements 40 and 41 of the reader 33 and perforator 23, respectively, the perforated tape 28 can be prepared as desired. It is surely self-evident, or at least to be understood as so, that the teachings of the invention can also be employed for punched cards and the like.

While there are shown and described present preferred embodiments of the invention it is to be distinctly understood that the invention is not limited thereto but may be otherwise variously embodied and practiced within the scope of the following claims.

What is claimed is:

1. An independent perforated tape accessory device for a ciphering machine having an input connected to keying mechanisms and an output connected to a printer, said accessory device comprising:

a tape perforator;
a perforated tape reader;
code translator means operatively connected between said ciphering machine and both said tape perforator and said perforated tape reader;
first switching means operative to selectively connect said tape perforator to said input and to said output of said ciphering machine; and
second switching means operative to selectively connect said perforated tape reader to said input of said ciphering machine, said output of said ciphering machine, and to said tape perforator, said connection to said tape perforator including said first switching means.

2. An independent perforated tape accessory device for a ciphering machine having an input means and an output means and operating according to a binary multiple step code, said accessory device comprising:

tape perforator means;
perforated tape reader means;
first and second code translator means coupled with said tape perforator means;
selection means for selectively connecting said tape perforator means with the input means of the ciphering machine through said first code translator means and with the output means of the ciphering machine through said second code translator means;
third code translator means coupled with said perforated tape reader means; and,
means for connecting said perforated tape reader means to the input means of the ciphering machine through said third code translator means.

3. An accessory device as defined in claim 2, further including printing means coupled with the ciphering machine for selectively printing information supplied to the input means of the ciphering machine and the information delivered to the output means of the ciphering machine.

4. An accessory device as defined in claim 2, wherein said first, second and third code translator means have respective inputs and outputs; said input of said first code translator means being connected with said output of said third code translator means and with the input means of the ciphering machine; said input of said third code translator means being connected with said perforated tape reader means; said input of said second code translator means being connected with the output means of the ciphering machine; and wherein said outputs of both said first and second code translator means are selectively connected to said tape perforator means.

5. An accessory device as defined in claim 4, wherein both said tape perforator means and said perforated tape reader means operate in response to a multiple bit parallel code.

6. A perforated tape accessory device according to claim 2, in which said tape perforator means is provided with a programming device for introducing additional signals to information delivered to said tape perforator means.

7. A perforated tape accessory device according to claim 2, in which said tape reader means is provided with program detector means.

References Cited

UNITED STATES PATENTS

| | | | |
|---|---|---|---|
| 2,458,406 | 1/1949 | Nichols | 178—22 |
| 2,993,089 | 7/1961 | Negri | 178—22 |
| 3,229,037 | 1/1966 | Sturzinger et al. | 178—22 |
| 3,057,955 | 10/1962 | Hirsch | 178—22 |

THOMAS A. ROBINSON, Primary Examiner

U.S. Cl. X.R.

178—26